United States Patent
Jammu et al.

(10) Patent No.: US 7,133,756 B2
(45) Date of Patent: Nov. 7, 2006

(54) METHOD AND SYSTEM FOR AUTONOMOUSLY RESOLVING A FAILURE

(75) Inventors: Vinay Bhaskar Jammu, Niskayuna, NY (US); Raj Mohan Bharadwaj, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/059,795

(22) Filed: Feb. 17, 2005

(65) Prior Publication Data
US 2005/0139728 A1 Jun. 30, 2005

Related U.S. Application Data

(63) Continuation of application No. 10/370,824, filed on Feb. 20, 2003, now Pat. No. 6,886,472.

(51) Int. Cl.
G01M 17/00 (2006.01)
(52) U.S. Cl. ............... 701/29; 701/31; 246/167 R
(58) Field of Classification Search ........... 246/122 R, 246/167 R, 2; 701/3, 29, 35, 31; 105/26.05, 105/29; 706/45, 50; 340/945
See application file for complete search history.

(56) References Cited

U.S. PATENT DOCUMENTS

| | | | |
|---|---|---|---|
| 2,481,239 A * | 9/1949 | Preston et al. ............ 340/989 |
| 5,581,689 A | 12/1996 | Slominski et al. | |
| 5,845,272 A | 12/1998 | Morjaria et al. | |
| 6,301,531 B1 | 10/2001 | Pierro et al. | |
| 6,341,359 B1 | 1/2002 | Aiken et al. | |
| 6,694,235 B1 | 2/2004 | Akiyama | |
| 6,697,718 B1 | 2/2004 | Le Draoullec et al. | |
| 2002/0152442 A1* | 10/2002 | Shau ........................ 714/779 |
| 2004/0237068 A1* | 11/2004 | Ren ........................... 717/110 |

FOREIGN PATENT DOCUMENTS

JP 62281051 A 12/1987

* cited by examiner

Primary Examiner—Mark T. Le
(74) Attorney, Agent, or Firm—Carlos Luis Hanze; Terry M. Sanks; Beusse Wolter Sanks Mora & Maire, P.A.

(57) ABSTRACT

In a railroad locomotive having a plurality of systems which collectively are used for locomotive operations, a method of self-healing a system of the plurality of systems comprising monitoring operational conditions of the system, detecting at least one of a pending and a current failure, determining a self-healing procedure to correct the failure, and applying the self-healing procedure comprising at least one of a safe mode technique, a redundancy technique, and an automatic configuration technique.

16 Claims, 4 Drawing Sheets

METHOD AND SYSTEM FOR AUTONOMOUSLY RESOLVING A FAILURE

CROSS REFERENCE TO RELATED APPLICATIONS

This application is a continuation of and claims the benefit of the Feb. 20, 2003 filing date of U.S. patent application Ser. No. 10/370,824 now U.S. Pat. No. 6,886,472.

BACKGROUND OF THE INVENTION

This invention generally relates to diagnostics and repair, and more particularly to a method and system for correcting a malfunction or breakdown of a machine, such as a locomotive, a system, and/or a process.

The diagnosis, repair, maintenance and/or other servicing of generally complex equipment, such as mobile assets that may include on-road and off-road vehicles, ships, airplanes, railroad locomotives, trucks, and other forms of complex equipment including industrial equipment, consumer appliance equipment, medical imaging equipment, equipment used in industrial processes, telecommunications, aerospace applications, power generation, etc. involves extremely complex and time consuming processes. In the case of transportation equipment, such as a locomotive and a fleet of locomotives, the efficient and cost-effect operation of a vehicle or fleet of vehicles demands minimization of the number of vehicle failures while in use, minimization of vehicle downtime and the expeditious and accurate performance of diagnostic, repair, maintenance and/or other services to the vehicles.

A locomotive is one example of a complex electromechanical system comprising a plurality of complex systems and subsystems. Many if not all of these systems and subsystems are manufactured from components that will fail over time. The operational parameters of a locomotive system or subsystem are frequently monitored with on-board sensors that may continually monitor on-board operational parameters of systems, subsystems, and/or other components during operation of the locomotive to detect potential or actual failures. The on-board system may also log fault data or other fault indicators when anomalous operating conditions arise. If a failure condition or a set of failure conditions is detected then a service technician may study the fault log and/or indicator after a locomotive has arrived in a service yard to identify the nature of the problem and determine whether a repair and/or maintenance service is necessary. Conducting the diagnostics at the service yard for all faults detected may extend the overall amount of time the vehicle is out of service, especially when considering the complexity of locomotive systems and subsystems, it is sometimes difficult to precisely identify a failed component or other cause of the failure conditions.

This may be because the effects or problems that the failure has on the system or subsystem are often neither readily apparent in terms of their source nor unique. Sometimes the recommended fix for a problem may not resolve the problem due to the complexity of the problem and/or diagnostic efforts. With some components, this is not a significant issue. For example, if a component has binary functional properties in that it either works properly or it doesn't, such as a mechanical or electrical switch, then diagnosing, recommending a fix and determining that the fix was correct is typically not too difficult. However, with more complex problems these efforts may be more difficult and may lead to the inefficient operation or underutilization of a locomotive or fleet of locomotives.

Diagnosing failure conditions associated with complex machines such as systems and subsystems of a locomotive may be performed by experienced personnel who have in-depth training and experience in working with a particular type of machine. Typically, these experienced individuals may use current and historical information associated with a problem that has been recorded in a written or electronic log. Using this information, the technicians apply their accumulated experience, knowledge and training, in mapping incidents occurring in a complex system and/or subsystem to problems that may be causing the incidents.

Computer-based systems are also used to automatically diagnose problems in a machine to overcome some of the disadvantages associated with relying completely on experienced personnel. This may increase the speed and consistency of the diagnosis. Computer-based systems are becoming more popular and may utilize a mapping between the observed failure conditions and the equipment problems using techniques such as table look-ups, symptom-problem matrices, and production rules, for example. These techniques work well for simplified systems having simple mappings between symptoms and problems. However, more complex equipment and process diagnostics seldom have such simple correspondences. Consequently, recommended fixes may be made that do not solve a problem immediately or completely. This may not be determined for sometime after the fix was executed, leading to the potential for recommending the same improper fix when that problem is next identified.

Accordingly, it is desirable to provide a method and system for monitoring the resolution of problems associated with a machine, such as a locomotive, and verifying that an executed fix instruction has resolved that problem. The ability to monitor and verify the resolution of problems with a locomotive's systems and/or subsystems is advantageous because this ability may minimize overall locomotive downtime, leading to a cost savings for the operator of the locomotive or a fleet of locomotives.

BRIEF SUMMARY OF THE INVENTION

This invention is directed to a method and system for providing a self-healing technique to correct a fault encountered during operation of a machine, system, and/or process, such as a locomotive. A preferred method comprises monitoring operational conditions of a component and/or a subsystem of the remote asset. Sensors are used to detect an impending failure associated with at least the component and/or the subsystem. After the failure is isolated, a self-healing procedure is selected to correct the failure. The self-healing procedure is applied wherein the self-healing procedure is a safe mode technique, a redundancy technique, and/or an automatic configuration technique. Verification as to whether the self-healing technique corrected the failure is then made.

In a preferred embodiment, a system for autonomously correcting a failure is disclosed comprising a sensor connected to a machine, such as a locomotive, system, and/or a process to monitor and collect operating conditions data. A method of self-healing a locomotive is provided wherein either a pending or current failure is detected or identified. Once a current or pending failure is detected, a determination is made as to a self-healing technique to use to correct the pending and/or current failure. The self-healing technique is then implemented.

A diagnostics system is also provided that receives the data from the sensor and isolates a pending and/or occurring failure. A processor is connected to the diagnostics system to determine a self-healing technique for the failure. The self-healing technique comprises a self-healing control technique, a redundancy technique, and/or an automatic fix technique.

In another preferred embodiment, a method comprises identifying a fault. A level of confidence as to a cause of the fault is determined. If the level of confidence is above a desired threshold, a self-healing procedure is selected. A determination is made as to whether the mobile asset is in a safe mode to accept the self-healing procedure before using the self-healing procedure. The mobile asset is placed in a safe mode to accept the self-healing procedure, and then the self-healing technique is executed. Next, a validation is made as to whether the self-healing procedure corrected the fault.

BRIEF DESCRIPTION OF THE DRAWINGS

The invention itself, both as to organization and method of operation, may best be understood by reference to the following description in conjunction with the accompanying drawings in which like numbers represent like parts throughout the drawings and in which.

DETAILED DESCRIPTION OF THE INVENTION

With reference to the figures, exemplary embodiments of the invention will now be described. The scope of the invention disclosed is applicable to a plurality of systems, machines, and/or processes. Thus, even though embodiments are described specific to a mobile asset, in this case a locomotive, this invention is also applicable to other systems, machines, and/or processes, which comprise components and subsystems which may fail over time. Thus the terms system, machine, process, component, and subsystem can be used interchangeably. Likewise, even though the present invention is disclosed towards fixing pending faults, it is also applicable to correcting current faults.

Figure 1:
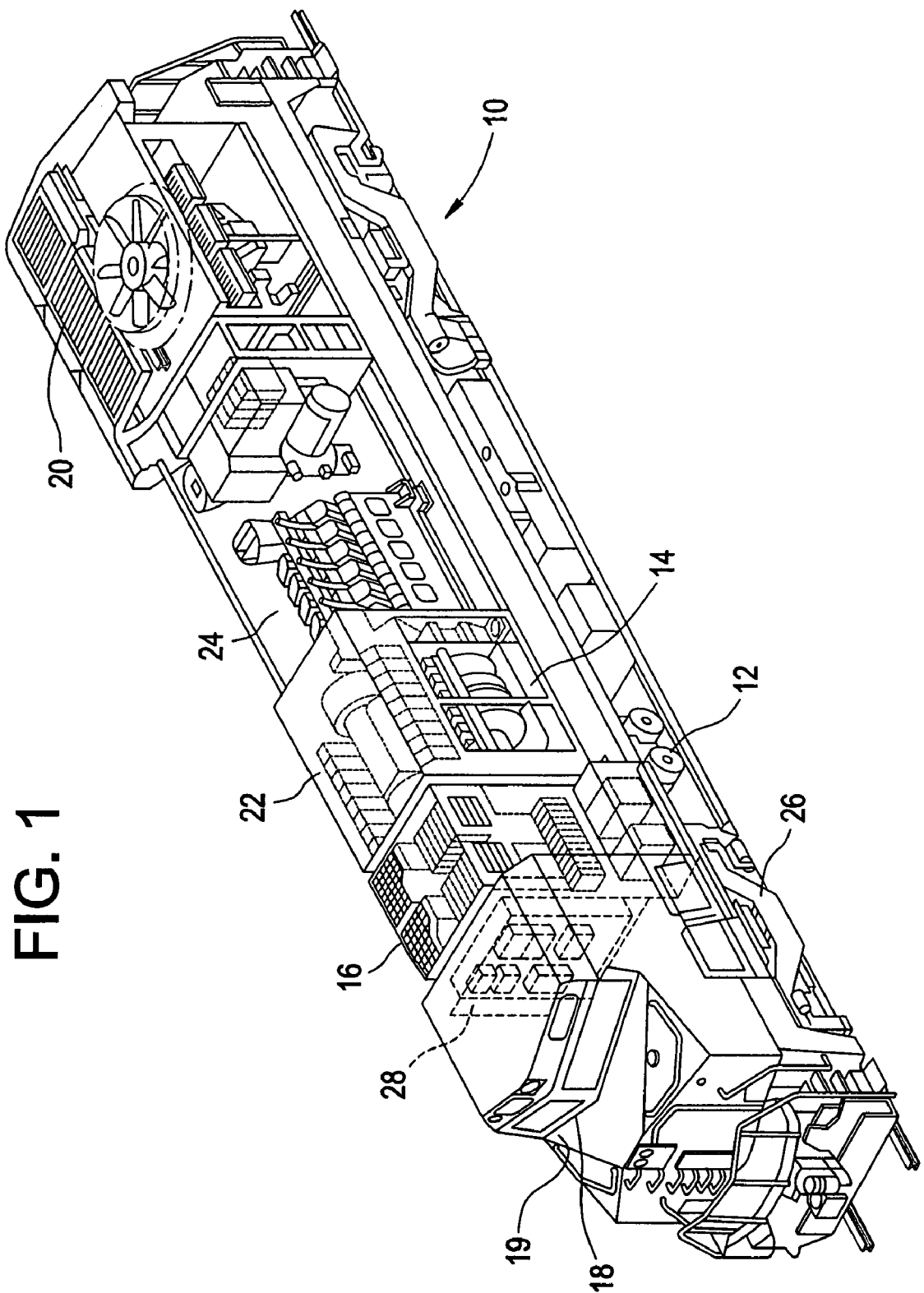
FIG. 1 is an illustration of an exemplary locomotive.

FIG. 1 is an illustration of an exemplary locomotive. The locomotive 10 may be either an AC or DC locomotive. The locomotive 10 is comprised of several complex systems, such as, but not limited to, an air brake system 12, an auxiliary alternator system 14, an intra-consist communications systems 18, a cable signal system 19, a distributed power control system 26, an engine cooling system 20, an equipment ventilation system 22, and a propulsion system 24. Some of these systems, or subsystems, work independent of the other systems, whereas others interact with other systems. The subsystems are monitored by an on-board monitor system 28, which tracks any incidents or faults occurring in any of the systems with an incident or fault log. In one embodiment, an on-board diagnostics system is also on-board to diagnose the incidents or faults. In another embodiment, the diagnostics system is at a remote monitoring facility. Though the present invention is described with respect to fixing a locomotive 10 where all necessary elements are on-board, one skilled in the art will recognize that this invention is applicable to off-board diagnostics systems and tools, as well, wherein a fix may be reached off-board and then communicated to the locomotive 10.

Figure 2:
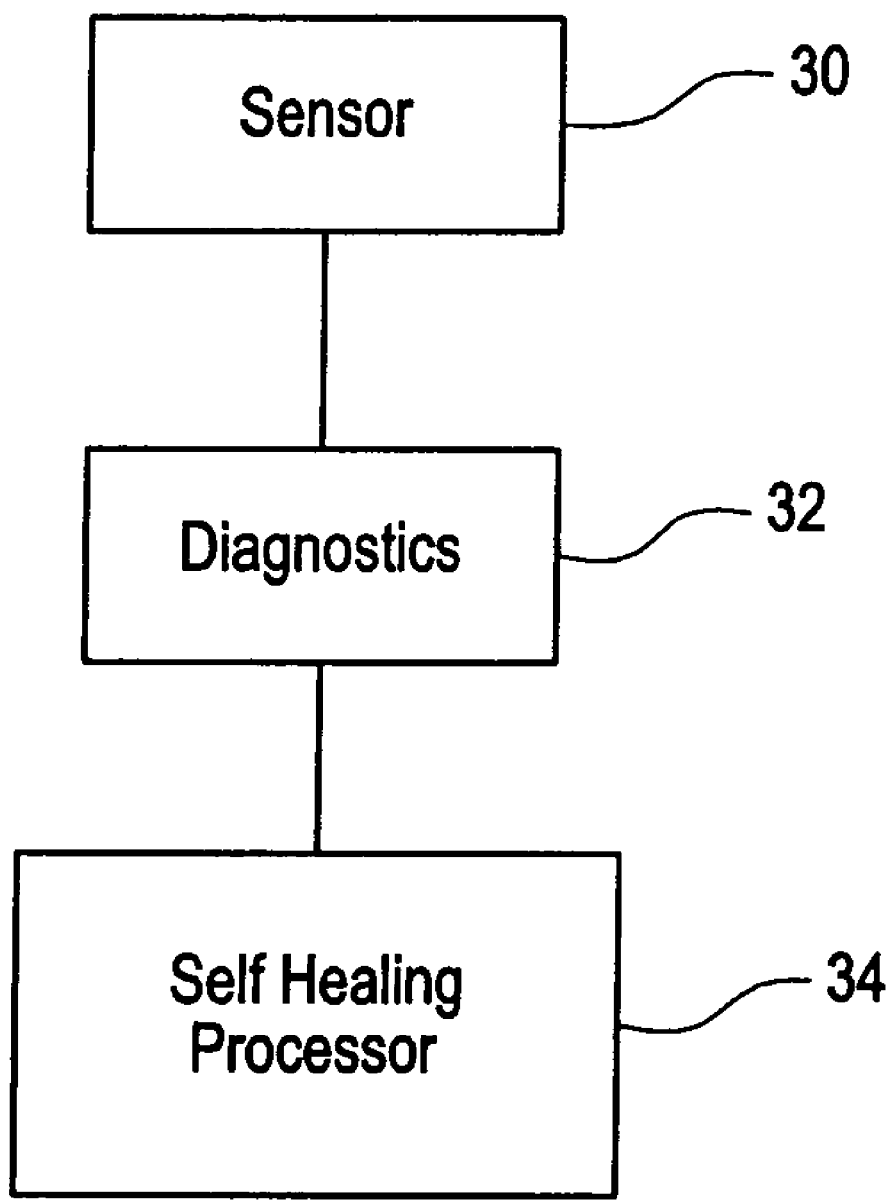
FIG. 2 is a block diagram of exemplary elements of the present invention.
Figure 3:
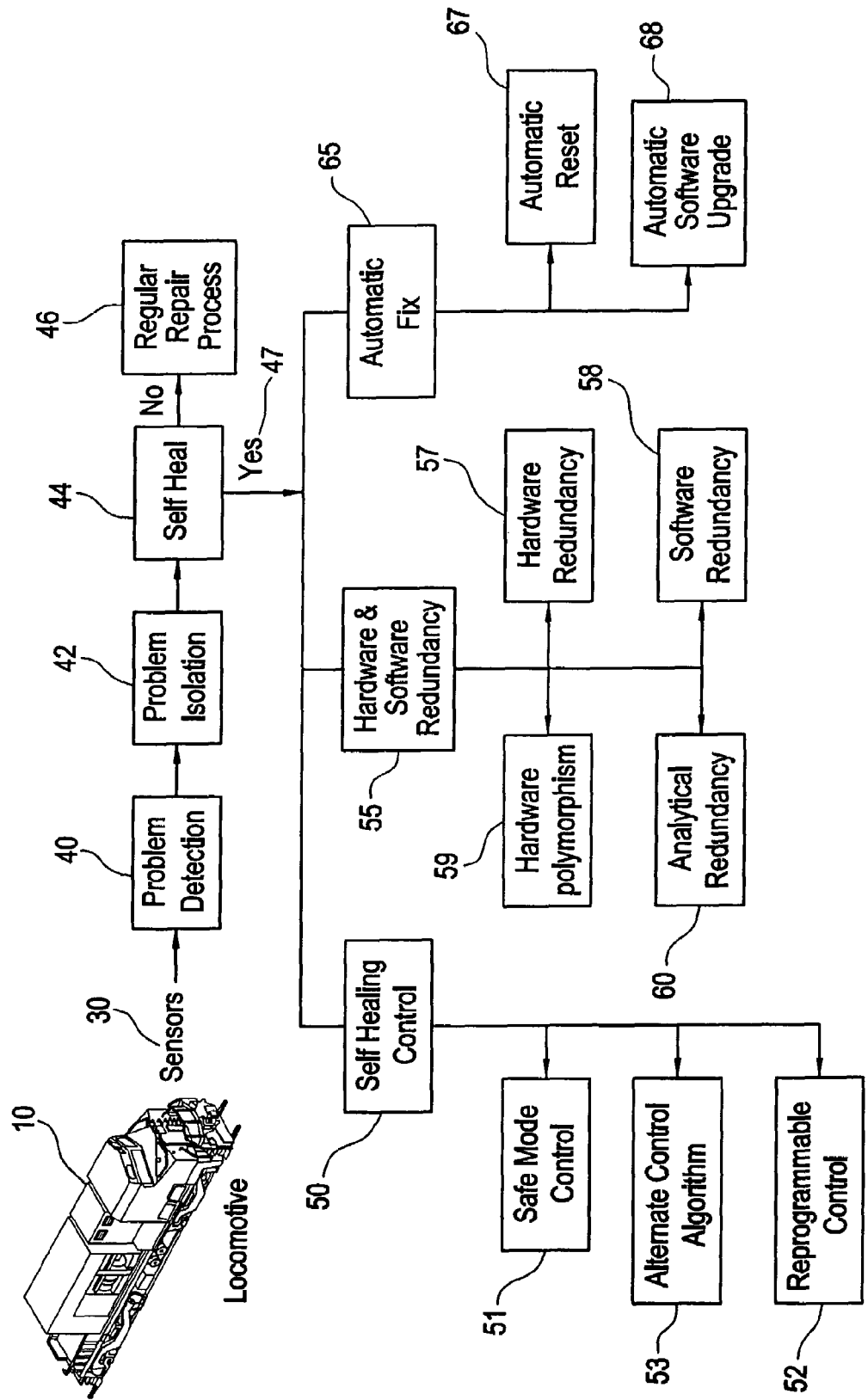
FIG. 3 is a chart illustrating exemplary elements of the present invention.

FIG. 2 is a block diagram of exemplary elements of the present invention and FIG. 3 is a chart illustrating exemplary elements of the present invention. Sensors 30 are provided on the locomotive 10, which collect data about performance of a plurality of subsystems. The data collected is either in the form of data packs, raw data, and/or custom data. The data is then processed in a diagnostics system 32, or process, to determine faults and impending faults 40. After a fault is detected, the diagnostics system 32 is used to isolate the fault. Such diagnostics processes may include, but are not limited to, applying rule-based systems, Case-Based Reasoning, and Belief Networks to accomplish this task. In a preferred embodiment, the diagnostics process relates a specific combination of anomalies to individual problems to isolate the fault. Once a fault is isolated 42, a decision 44 is made as to whether the fault is a candidate for self-healing or whether a regular, traditional, or existing repair process should be implemented 46. In a preferred embodiment, a processor 34 is used to determine whether self-healing will be used. In another preferred embodiment, a processor in the diagnostics system 32 is used to make the self-healing decision. If self-healing is the selected option 47, then one or a combination of self-healing techniques is utilized. One skilled in the art will recognize that no precise order for implementing a self-healing technique is required and that the following techniques may be used in any order, dependent of the failure detected, and/or the component affected.

One self-healing technique, or procedure, that may be implemented is a self-healing control technique 50. A self-healing control technique 50 employs various control strategies to prevent or stop a failure by utilizing alternate control strategies to bypass the effects of the failure. For example, in one embodiment, referred to as safe mode control 51, a failure can be avoided by operating in a safe mode. With respect to a locomotive 10, when a failure is detected, a locomotive controller can switch the subsystem or component experiencing the problem into a safe mode operation. Though the safe mode operation may be different for various subsystems, in one embodiment the safe mode would comprise disabling certain functions of the subsystem and/or turning off or shutting down the subsystem.

In another safe mode control technique embodiment referred to as reprogrammable control 52, the locomotive would reset the subsystem to operate in less than optimal operating conditions to mitigate the effects of the failure. For example, instead of operating a subsystem at its peak conditions (e.g., optimum speed, best voltage), the locomotive control operates the subsystem at a lower operating condition (such as at much lower speed or voltage). Another reprogrammable control technique also comprises operating the locomotive controller at less than optimal gains, and using alternate models/equations to perform the required control.

Another embodiment of self-healing control is using an alternate control algorithm 53, such as Proportional-Integral-Derivative (PID). PID is a typical algorithm used in industrial control system designed to eliminate a need for continuous operator attention. This is a type of feedback controller whose output, a control variable, is generally based on an error between some user-defined set point and some measured process variable where each element of the PID controller refers to a particular action taken based on the error.

In a system due to component or sensor failure, an error signal may change, pushing the controller beyond its optimal operating region. These failures can potentially drive the controller into an unstable region. In the self-healing version of PID control, an increase in controller error will automatically initiate a self-detection algorithm, which shall identify the root cause for the error increase and subsequently initiate the tuning of the PID controller to compensate for the failure. The tuning algorithm is usually dependent on the failure and the desired direction of compensation. In the present invention, the locomotive controller can also use similar approaches, such as, but not limited to, Proportional-Integral (PI), Proportional-Derivative (PD), and/or sliding mode control. The alternate algorithm used depends on the subsystem and its associated failure.

Another self-healing technique that may be utilized is a hardware and software redundancy technique 55. This technique employs the use of built-in redundancy in hardware and/or software to mitigate the effects of the failure. Thus, with respect to hardware redundancy 57, when a failure occurs in a locomotive's subsystems, an alternate, or secondary, redundant subsystem or component within the subsystem, component, and/or locomotive is used in place of the failed subsystem or component to deliver the same function. Similarly, the software redundancy 58 operates in a similar fashion whereas in a preferred embodiment, alternate copies of the same software reside in a computer or processor on the locomotive 10. If the present software fails due to corruption, the alternate copy of the software is used in its place. Another strategy is hardware polymorphism 59. A piece of hardware or component is polymorphic if the hardware can deliver multiple alternate functionality through automatic reprogramming. Thus, as an example, when a circuit inverter on a locomotive axle fails, its function may be picked up by the inverter on the next axle, or by a controller chip which has the necessary calculation cycles and hardware connection and capacity to execute the function. Another technique is analytical redundancy 60. In this strategy, redundancy between sensors is derived through analytical models. For example, if a locomotive's speed sensor fails, models may be employed to use the motor current signals to estimate values that would normally be provided by the speed sensor.

A third self-healing technique is an automatic-fix technique 65. One automatic-fix technique is an automatic reset 67. Locomotives encounter some faults while in transient that are not reliably reproducible when at a repair depot since they may occur due to external conditions. For example, a locomotive 10 may experience overheating when climbing a steep slope while carrying a full load, or may have sensors stop operating when passing a microwave tower. Such faults may immediately interfere with the operation of the locomotive 10. When detected, the system 5 will automatically reset the subsystem with the fault, such as switching the subsystem or component off and then back on, which then automatically corrects the fault. Another automatic-fix technique is an automatic software upgrade 68. When certain software and/or hardware is upgraded, other pieces of hardware and/or software may not function properly in combination with the upgrade. In an automatic software upgrade technique 68, a repository of various versions of software and a compatibility matrix are maintained in a database connected to a processor. In one embodiment the database and processor are remote from the locomotive 10. In another embodiment these components are on-board the locomotive. When a software-related fault is identified, the locomotive 10 would communicate with the processor, which evaluates the fault using the compatibility matrix. If an incompatibility in software is detected, a software upgrade is automatically loaded to the specific processor or subsystem on the locomotive 10.

Figure 4:
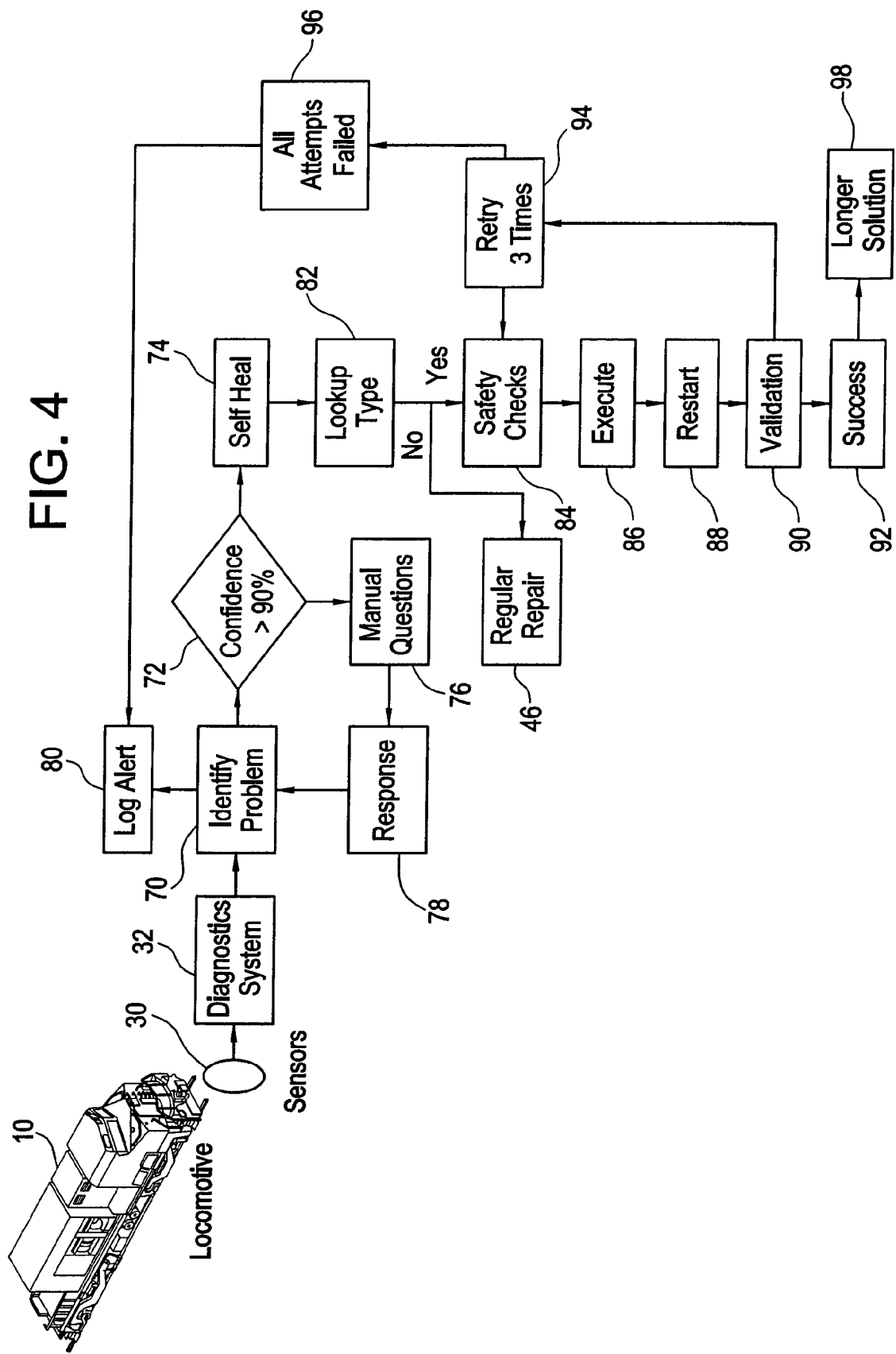
FIG. 4 is an exemplary flow chart of steps taken when implementing the self-healing technique.

FIG. 4 is an exemplary flow chart of steps taken when implementing the self-healing technique. Sensors 30 transmit data, including fault data to a diagnostics system 32. Based on the analysis performed by the diagnostics system 32, a fault, or problem, is identified, Step 70. In identifying the fault, a determination is made by the diagnostics system as to the level of confidence the diagnostics system has making the identification of the fault, Step 72. In a preferred embodiment, if the diagnostics system is ninety percent (90%) or more confident in its identification of the fault, the system will progress to a self-healing technique, Step 74. As one skilled in the art will recognize, the confidence level of the diagnostics system 32 can be a plurality of levels, preferably over 50%, and not just 90%. If the diagnostics system's 32 confidence is lower than the threshold level, such as 90% in the illustrated embodiment, the diagnostics system 32 will ask a plurality of questions of a user, Step 76. Such questions may include, but are not limited to asking questions about track conditions, environmental conditions, switch settings, etc. Based on the responses of the user, Step 78, this information is provided to the diagnostics system 32 and the confidence level in the detected fault is recalculated 72. In one embodiment, this process can continue a plurality of times until the diagnostics system has obtained enough information to raise its confidence level above the threshold. In another embodiment, after a defined number of attempts to raise its confidence level, the diagnostics systems will cease trying, and log the fault as an alarm or an alert, Step 80 and wait for more information to be gathered, generally with the sensors 30.

To determine a confidence level, a diagnostics system can use a plurality of paradigms. Though not limited to these examples, a Case-Based Reasoning system and/or a Rule-Based system may be used to compute a confidence matrix, where rule based probabilistic theory techniques are used.

Once the confidence threshold is met, the system moves to the self-healing techniques, Step 74. First, the system will determine if the fault is one that is possible to cure with one of the self-healing techniques, Step 82. To make this determination, in a preferred embodiment, a database contains a table or matrix comprising a list of events and identifications identifying whether the fault is a self-healing fault or not. If the fault is not a self-healing candidate, then the normal or regular fix to the fault is used 46.

In a preferred embodiment, if after the system 5 determines the self-healing-technique to use, a safety check, Step 84 is performed to determine whether the locomotive 10 is in a safe mode to accept the procedures that the specific self-healing technique will perform and/or to place subsystems or components in operational conditions to accept the self-healing technique. For example, if a fuel pump needs to be shut down to implement a self-healing technique, such as the hardware redundancy technique, the locomotive must modify control parameters so that the horse power of the fuel pump distribute more load across the remaining fuel pumps, bypassing the one that has failed. After the safety checks are completed, Step 84, the self-healing technique is executed, Step 86. Then, if any functions were shut down or modified to execute the self-healing technique, the functions are restarted or returned to acceptable operational conditions, Step 88. The system 5 then validates that the self-healing technique fixed the fault, Step 90. If the fault was fixed, then the locomotive 10 considers the fix a success, Step 92. If the fault was not corrected, the system will cycle through the identified fix, in a preferred embodiment, three additional times, Step 94. If the fault is still not fixed, Step 96, the fault is logged as an alert, Step 80. In some situations, such as when a fuel pump is bypassed, this fix is only a temporary fix. Eventually the bypassed fuel pump must be manually inspected and/or replaced, Step 98.

While the invention has been described in what is presently considered to be a preferred embodiment, many variations and modifications will become apparent to those skilled in the art. Accordingly, it is intended that the invention not be limited to the specific illustrative embodiment, but be interpreted within the full spirit and scope of the appended claims.

What is claimed is:

1. Computer readable medium comprising a computer software code for autonomously self-healing each system of a plurality of systems of a locomotive having at least one computer, said computer software code comprising:
   a. a software module for a computer for monitoring operational conditions said each system of said plurality of systems;
   b. a software module for a computer for detecting at least one of a pending and a current failure in at least one of said systems;
   c. a software module for a computer for determining a self-healing procedure to correct said failure in at least one of said systems;
   d. a software module for a computer for applying said self-healing procedure comprising code for at least one of a self-healing control technique, a redundancy technique, and an automatic fix technique to correct said failure in at least one of said systems;
   e. wherein at least one of the software module for a computer for determining a self-healing procedure and the software module for a computer for applying said self-healing procedure comprises code for providing a sub-software module for operating a controller at less than an optimal level while using an alternate software module to perform controller functions; and
   f. wherein said code for the hardware and software redundancy technique further comprises code for ceasing use of a software program associated with said system experiencing said failure and using a redundant copy of said software program.

2. The computer readable medium of claim 1 wherein said code for the self-healing control technique comprises code for operating said system in a safe mode condition.

3. The computer readable medium of claim 1 wherein said code for the redundancy technique comprises code for using a hardware and software redundancy technique.

4. The computer readable medium of claim 3 wherein said code for the hardware and software redundancy technique further comprises code for ceasing use of said system experiencing said failure and using a redundant system.

5. The computer readable medium of claim 3 wherein said code for the hardware and software redundancy technique further comprises code for reprogramming said redundant system to replace said system experiencing said failure.

6. The computer readable medium of claim 1 wherein said code for the automatic fix technique comprises code for automatically resetting said system when a pending fault is detected.

7. The computer readable medium-of claim 1 further comprising a software module for logging an alert if at least one of said self-healing techniques did not correct said failure and a level of confidence does not exceed a desired threshold.

8. The computer readable medium of claim 1 wherein the software module for determining said self-healing technique further comprises code for evaluating said failure with a matrix comprising a list of failures fixable with said self-healing technique.

9. Computer readable medium comprising a computer software code for autonomously self-healing each system of a plurality of systems of a locomotive having at least one computer; said computer software code comprising:
   a. a software module for a computer for monitoring operational conditions of said each system of said plurality of systems of the locomotive
   b. a software module for a computer for detecting at least one of a pending and a current failure in at least one of said systems based on a change in operational conditions;
   c. a software module for a computer for determining a self-healing procedure to correct said failure in at least one of said system;
   d. a software module for a computer for applying said self-healing procedure comprising code for at least one of a self-healing control technique, a redundancy technique, and an automatic fix technique to correct said failure in at least one of said systems;
   e. wherein said code for the self-healing control technique comprises code for providing a software module for operating a controller at less than an optimal level while using an alternate software module to perform controller functions; and
   f. wherein said code for the hardware and software redundancy technique further comprises code for applying an analytical model to estimate a measurable value generated by said system when said value can not be measured due to said failure.

10. The computer readable medium of claim 9 wherein said code for the self-healing control technique comprises code for operating said system in a safe mode condition.

11. The computer readable medium of claim 9 wherein said code for the redundancy technique comprises code for using a hardware and software redundancy technique.

12. The computer readable medium of claim 11 wherein said code for the hardware and software redundancy technique further comprises code for ceasing use of said system experiencing said failure and using a redundant system.

13. The computer readable medium of claim 11 wherein said code for the hardware and software redundancy technique further comprises code for reprogramming said redundant system to replace said system experiencing said failure.

14. The computer readable medium of claim 9 wherein said code for the automatic fix technique comprises code for automatically resetting said system when a pending fault is detected.

15. The computer readable medium of claim 9 further comprising a software module for logging an alert if at least one of said self-healing techniques did not correct said failure and a level of confidence does not exceed a desired threshold.

16. The computer readable medium of claim 9 wherein the software module for determining said self-healing technique further comprises code for evaluating said failure with a matrix comprising a list of failures fixable with said self-healing technique.

* * * * *